(12) United States Patent
Sakamoto et al.

(10) Patent No.: US 8,452,990 B2
(45) Date of Patent: May 28, 2013

(54) BROWSING TERMINAL, CHARGING TERMINAL, AND COMMUNICATION SYSTEM AS WELL AS TRANSMITTING/RECEIVING SYSTEM USING THE SAME

(75) Inventors: Michiaki Sakamoto, Kawasaki (JP); Kenichi Takatori, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 1018 days.

(21) Appl. No.: 12/367,906

(22) Filed: Feb. 9, 2009

(65) Prior Publication Data

US 2009/0204840 A1 Aug. 13, 2009

(30) Foreign Application Priority Data

Feb. 12, 2008 (JP) ................................ 2008-031175
Feb. 3, 2009 (JP) ................................ 2009-022564

(51) Int. Cl.
*G06F 1/26* (2006.01)

(52) U.S. Cl.
USPC .............. 713/300; 455/573; 705/905; 726/33

(58) Field of Classification Search
USPC .............. 455/573; 705/905; 726/33; 713/300
See application file for complete search history.

(56) References Cited

U.S. PATENT DOCUMENTS

| | | | | |
|---|---|---|---|---|
| 7,696,718 B2 * | 4/2010 | Suzuki | ............................ | 320/108 |
| 8,145,194 B2 * | 3/2012 | Yoshikawa et al. | ............ | 455/411 |
| 2002/0013883 A1 * | 1/2002 | Kikuchi et al. | ................ | 711/112 |
| 2006/0069925 A1 * | 3/2006 | Nakai et al. | ................... | 713/193 |

FOREIGN PATENT DOCUMENTS

| | | | |
|---|---|---|---|
| CN | 1351775 | A | 5/2002 |
| CN | 2779485 | Y | 5/2006 |
| JP | 11-68994 | A | 3/1999 |
| JP | 3099736 | B2 | 8/2000 |
| JP | 2003-98974 | A | 4/2003 |
| JP | 2004-78699 | A | 3/2004 |
| JP | 2004126374 | A | 4/2004 |
| JP | 2004195935 | A | 7/2004 |
| JP | 3610260 | B2 | 10/2004 |
| JP | 2005128406 | A | 5/2005 |
| JP | 2006350190 | A | 12/2006 |
| JP | 2007156559 | A | 6/2007 |
| JP | 2007219701 | A | 8/2007 |
| JP | 2007265337 | A | 10/2007 |
| JP | 2008-5042 | A | 1/2008 |
| WO | 0072424 | A1 | 11/2000 |

OTHER PUBLICATIONS

Chinese Office Action dated Jun. 1, 2012 in Application No. 200910004115.7.
Office Action, dated Mar. 26, 2013, issued by the Japanese Patent Office in counterpart Japanese Application No. 2009-022564.

* cited by examiner

*Primary Examiner* — Albert Wang
(74) *Attorney, Agent, or Firm* — Sughrue Mion, PLLC

(57) ABSTRACT

To provide a browsing terminal and the like with high security, which can effectively prevent contents data stored in a terminal from being stolen unlawfully by a third party even if the terminal is accidentally lost. The browsing terminal includes: a receiving part for receiving contents data; a volatile memory for storing the received contents data; a display device with a memory function, which displays the contents data stored in the volatile memory; and a secondary battery for supplying power to the volatile memory and the display device.

2 Claims, 11 Drawing Sheets

UNAUTHENTICATED CASE (NG)

AUTHENTICATED CASE (OK)

UNAUTHENTICATED CASE (NG)

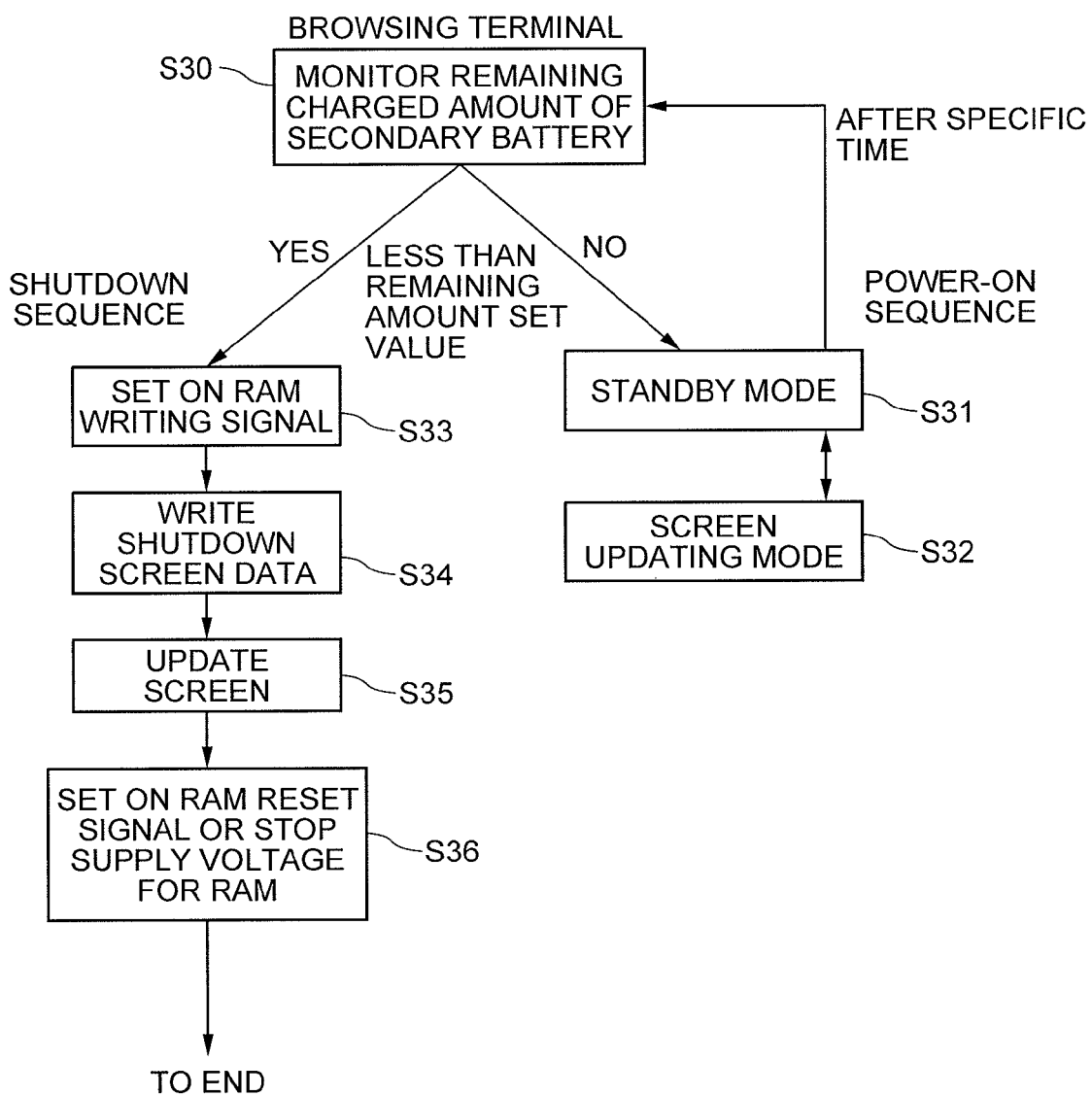

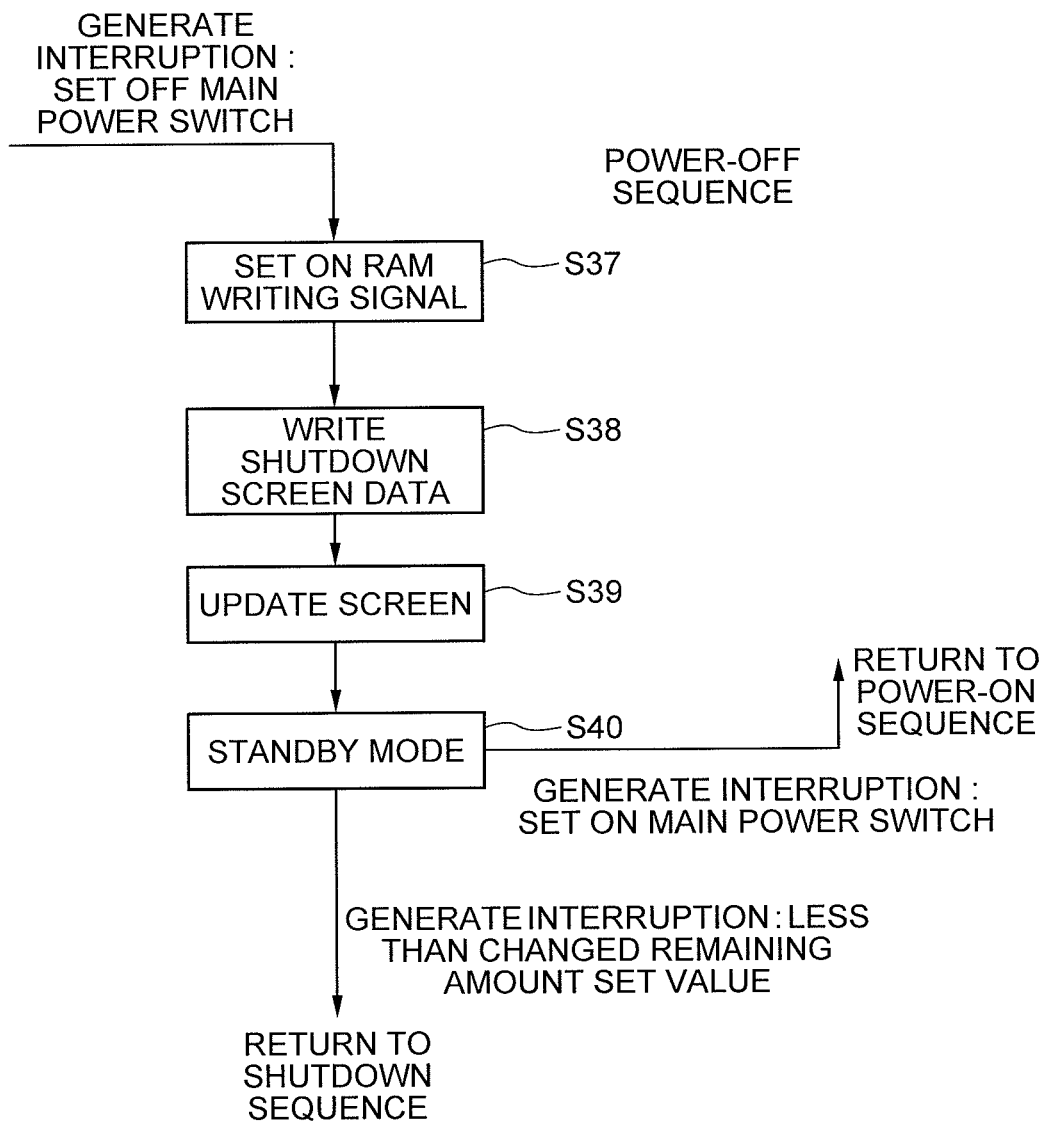

BROWSING TERMINAL, CHARGING TERMINAL, AND COMMUNICATION SYSTEM AS WELL AS TRANSMITTING/RECEIVING SYSTEM USING THE SAME

CROSS-REFERENCE TO RELATED APPLICATIONS

This application is based upon and claims the benefit of priority from Japanese patent application No. 2008-031175, filed on Feb. 12, 2008 and No. 2009-022564, filed on Feb. 3, 2009, the disclosure of which is incorporated herein in its entirety by reference.

BACKGROUND OF THE INVENTION

1. Field of the Invention

The present invention relates to a browsing terminal, a charging terminal, and systems using those terminals. Particularly, the present invention relates to a browsing terminal and a charging terminal which can effectively suppress unlawful use of contents data, and to a communication system as well as a transmitting/receiving system utilizing those terminals.

2. Description of the Related Art

Recently, there has been a social demand in achieving a browsing terminal that can fill in for papers, with which latest newspaper contents automatically distributed from a server, i.e., news updated successively, can be read by simply being inserted to a stand (charger) without starting up a PC (personal computer).

For example, a book viewer of Amazon.com. Inc. called "Kindle" has a display using a high-resolution electronic paper (product of E Ink Corporation) with a radio connecting function to be connected to contents servers using the Internet, which allows a user to download and read on-line books, blogs, newspapers, and magazines directly without using a personal computer.

Therefore, the user can automatically receive contents distributions by subscribing to magazines, newspapers, blogs, and the like. An example of such browsing terminal is disclosed in Japanese Patent No. 3099736 (Patent Document 1).

This terminal device has: a display device such as an LCD; an input device having some kinds of keys such as page-turning keys; a storage device configured with a nonvolatile memory such as an EEPROM; a main storage configured with a volatile memory such as a RAM; a device for transmitting/receiving data and the like; and a secondary battery for supplying power. Data obtained from an information server is stored to the non-volatile storage device.

An example of a transmitting/receiving system using such browsing terminal and charging device is disclosed in Japanese Patent No. 3610260 (Patent Document 2). Disclosed is a system which is configured with a charging device having a data receiving circuit, and a portable information terminal having a secondary battery and a data storage built-in thereto, wherein the secondary battery is charged and information is stored to the data storage by the charger.

Further, a system for charging fees according to the charging amount of the browsing terminal and the download amount of the contents data by using the above-described system is disclosed in Japanese Unexamined Patent Publication 11-68994 (Patent Document 3).

With such information terminal system, it is possible to redistribute the contents obtained from a server unlawfully by downloading the contents to a PC via the charger and the like. Therefore, there faces an issue of security. Further, processing of the system becomes complicated, since the fee-charging processing is performed in two fee-charging systems, i.e., fee-charging according to the charging amount and fee-charging according to the downloaded contents.

An example of the above-described system for preventing the unlawful use of data is disclosed in Japanese Unexamined Patent Publication 2008-5042 (Patent Document 4). In this example, every time the power is supplied to the portable terminal, authentication information (identification number) registered to a ROM part in advance is transmitted to an authentication server to request authentication. Based on an authentication result received from the authentication server, personal data use permission information is registered to a RAM part, and the use of personal data registered to a storage part such as a flash memory is controlled based on the permission information.

As described above, the browsing terminal and the transmitting/receiving system using such terminal disclosed in Patent Documents 1 and 2 have the issues of security such as unlawful redistribution of the obtained contents. In order to suppress such issues, there may be considered the technique to employ a personal identification number using an authentication server and to employ encryption of contents as disclosed in Patent Document 4. However, the contents are stored in a storage such as a flash memory in the terminals disclosed in Patent Documents 1-4. Therefore, if the portable terminal is lost, it is possible for the identification number and the encryption to be decrypted, when the storage is taken out and stored data is downloaded unlawfully, for example.

Further, the format of the contents becomes unique due to the encryption and the like, so that it is difficult to be used with high versatility. Furthermore, there is also such an inconvenience that the system becomes complicated, since it is necessary to charge the fee according to the charging amount and the download amount as in Patent Document 4.

The Inventors of the present invention have designed the present invention in such a view that it is preferable for the contents data to be automatically erased from the terminal after a certain time has passed for the sake of security, believing that the terminal for browsing newspaper contents and the like distributed daily simply need to keep the data for about one day as the data browsing period, and its function can be narrowed down to a function of enabling browsing of about 20-30 pages of newspaper data.

SUMMARY OF THE INVENTION

It is therefore an exemplary object of the invention to improve the shortcomings of the above-described related techniques, and to provide a browsing terminal and a charging terminal with high security which can effectively prevent contents loaded in the terminal device from being improperly taken out by a third party even if the terminal device is accidentally lost. It is also an exemplary object of the invention to provide a communication system and a transmitting/receiving system using those terminals.

In order to achieve the foregoing exemplary objects, a browsing terminal according to an exemplary aspect of the invention includes: a receiving part for receiving contents data; a volatile memory for storing the received contents data; a display device with a memory function, which displays the contents data stored in the volatile memory; and a secondary battery for supplying power to the volatile memory and the display device.

In order to achieve the foregoing exemplary objects, an inter-terminal communication system according to another exemplary aspect of the invention includes a distribution terminal and a contents browsing terminal. The distribution terminal includes: a storage part for storing contents data transmitted from a distributor; a transmitting part for transmitting the contents data; and a charging part for charging the browsing terminal, and the browsing terminal includes: a receiving part for receiving the contents data transmitted from the transmitting part; a volatile memory for storing the received contents data; a display device with a memory function, which displays the contents data stored in the volatile memory; and a secondary battery for supplying power to the volatile memory and the display device.

In order to achieve the foregoing exemplary objects, a contents data transmitting/receiving system according to still another exemplary aspect of the invention includes a server for storing contents data, a distribution terminal for receiving distribution of the contents data from the server via a communication line, and a browsing terminal provided along the contents distribution terminal. The distribution terminal includes: a contents storage part for storing contents data transmitted from a distributor; a transmitting part for transmitting the contents data; and a charging part for charging the browsing terminal, and the browsing terminal includes: a receiving part for receiving the contents data transmitted from the transmitting part; a volatile memory for storing the received contents data; a display device with a memory function, which displays the contents data stored in the volatile memory; and a secondary battery for supplying power to the volatile memory and the display device.

BRIEF DESCRIPTION OF THE DRAWINGS

FIG. 10 is a flowchart for describing operations of a third exemplary embodiment; and FIG. 11 is a flowchart for describing operations of the third exemplary embodiment.

DETAILED DESCRIPTION OF THE EXEMPLARY EMBODIMENTS

Next, exemplary embodiments of the invention will be described in detail by referring to the accompanying drawings.

Browsing contents data that are browsed by a contents browsing terminal in the following exemplary embodiments indicate the whole screen information such as newspaper contents that are received from a server and a contents distribution terminal and kept in a memory. Other than such browsing contents data, headline information and various kinds of metadata related to the browsing contents data can be browsed as well. However, those are to be treated separately from the browsing contents data as the headline information and the metadata.

First Exemplary Embodiment (1.1) First, the Basic Structures of a Contents Data Transmitting/Receiving System and an Inter-Terminal Communication System will be Described by Referring to FIG. 1

Figure 1:
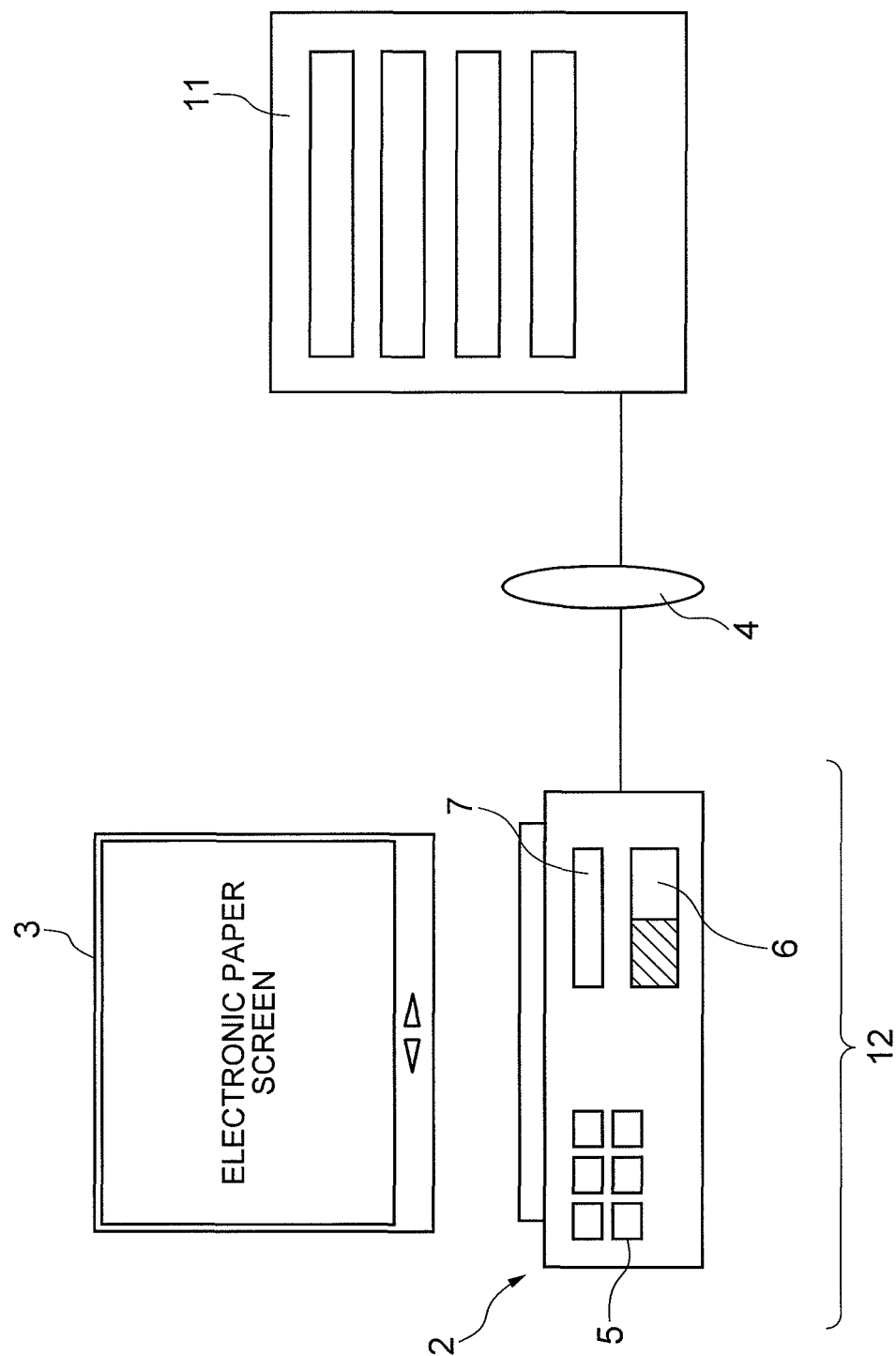
FIG. 1 is a schematic block diagram showing a structure of a data transmitting/receiving system for contents data according to a first exemplary embodiment of the invention.

In FIG. 1, basically, the contents data transmitting/receiving system is configured, including: a server 11 which distributes newspaper contents; a contents distribution terminal (simply referred to as "distribution terminal" hereinafter) 2 which receives contents from the server 11 and distributes the contents to a browsing terminal; and a contents browsing terminal (simply referred to as "browsing terminal" hereinafter) 3 which browses the contents obtained from the distribution terminal 2. An inter-terminal communication system 12 is configured with the distribution terminal 2 and the browsing terminal 3 described above, and the data transmitting/receiving system for transmitting/receiving data mutually is formed between the inter-terminal communication system 12 and the still higher-order server 11 and the like.

The distribution terminal 2 is structured to receive the contents distributed from the server 11 via a network 4, and the data is stored in a contents storage part (not shown). In an actual use, a user connects the browsing terminal 3 to the distribution terminal 2 to charge the browsing terminal 3 and selects the contents, pays a prescribed fee for the necessary charging amount while watching a charging-amount monitor screen, and uploads the contents to the browsing terminal 3.

In this case, it is so structured that a prescribed usable period for the maximum charging amount is limited to about one day, for example, and the uploaded contents are automatically erased when there is no power left in the power of the browsing terminal 3 after the browsing period ends.

Therefore, even if the user loses the browsing terminal 3, the contents data is automatically erased immediately after the power of the browsing terminal 3 runs out. Thereby, it can be formed as a system with a high security function, which is not likely to face an issue of security such as redistribution of data obtained unlawfully.

Fees are paid through a coin inserting slot 7 in FIG. 1. However, it is configured to use various kinds of forms such as: a form using various kinds of electric moneys; a form which bring close a portable telephone that carries an IC chip on which electronic money information is written; a form which provides electronic money information to the browsing terminal itself.

The charging-amount monitor screen 6 shown in FIG. 1 may be in a form which shows a simple color display indicating whether charging is still continued or completed, or in a form which shows the charging amount in a graph or numerical values. Further, the charging-amount monitor screen 6 is not an essential structure. It is also possible to employ other methods such as a method of displaying "charging completed" to the display device of the browsing terminal 3 side, or a method which notifies completion of charging with sounds.

The charging amount is related to the fee, so that it is preferable to monitor the charging amount by some kinds of measuring device. This monitoring is conducted by simply measuring voltage of both ends of a secondary voltage as a power supply part. More preferably, it may also be configured to conduct measurement and monitoring of the flow of the electric charges by a coulomb counter IC or a more sophisticated remaining-amount display IC.

The charging amount of the secondary battery measured in the manner described above can also be used for encouraging the charging by showing the remaining charged amount of the secondary battery, when the user of the browsing terminal is using the browsing terminal separately from the distribution terminal.

(1.2) Specific Structure of Inter-Terminal Communication System

Next, a specific structure of the inter-terminal communication system according to the first exemplary embodiment will be described by referring to FIG. 2.

Figure 2:
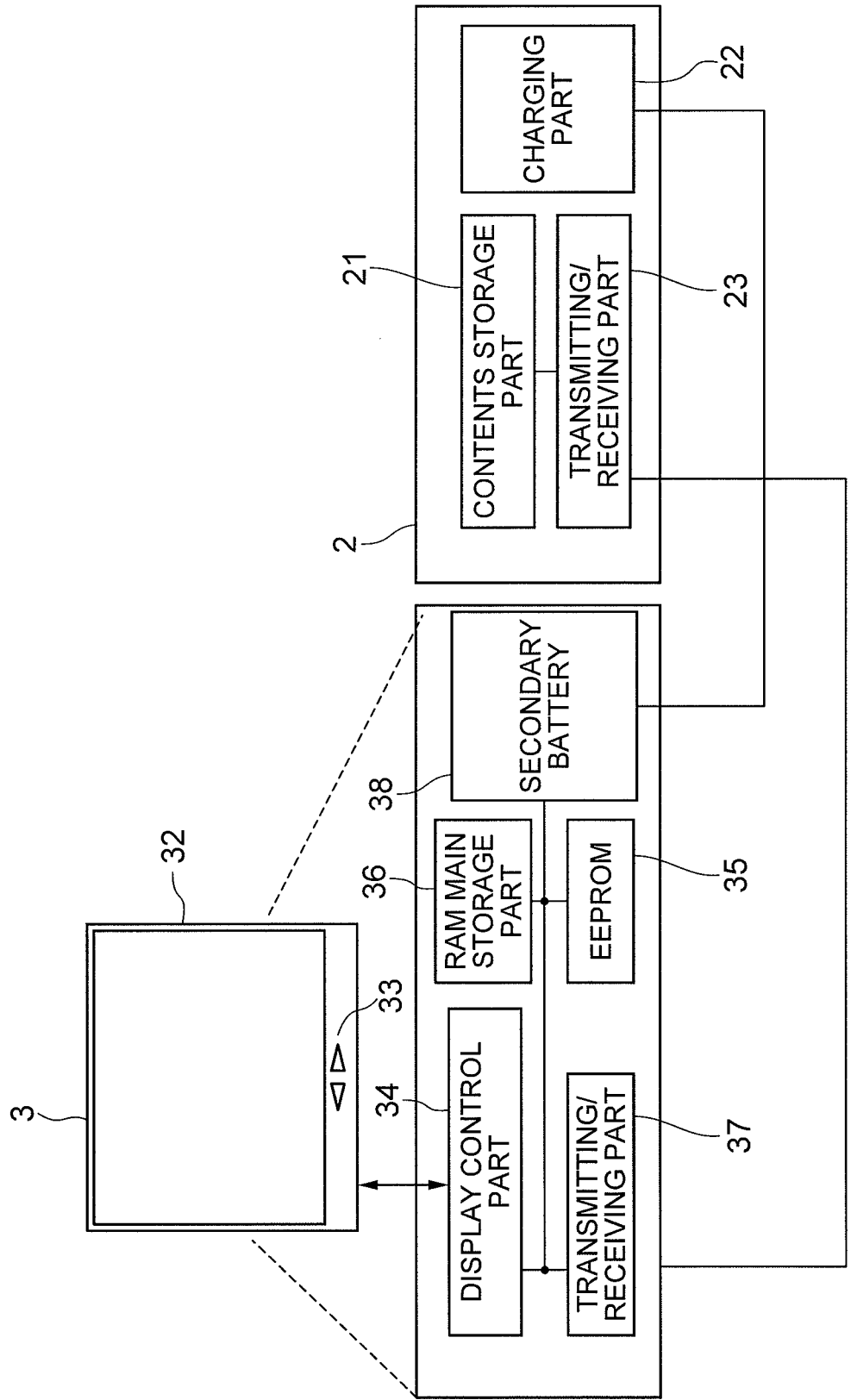
FIG. 2 is a block diagram showing a circuit structure of an inter-terminal communication system which configures the main part of the data transmitting/receiving system disclosed in FIG. 1.

In FIG. 2, the browsing terminal 3 is configured, including: a display device 32 configured with an electronic paper with a memory function; an input part 33 having a plurality of input keys; a display control part 34 for controlling displays on the display device 32; a nonvolatile memory 35 such as an EEPROM for storing a current state of the browsing terminal 3; a main storage part 36 configured with a volatile memory such as a RAM; a browser-side transmitting/receiving part 27 which exchanges contents data with the above-described contents distribution terminal 2 via a radio transmission device or the like; and a secondary battery 38 as a power supply for supplying power to each part within the browsing terminal 3.

Note here that the input part 33 may not have to be the keys but may be an input device such as a touch sensor or a touch panel. Further, it is also possible to employ a method which employs an acceleration sensor and utilizes the vertical moves thereof, for example.

In the meantime, the distribution terminal 2 is configured, including: a distribution-side transmitting/receiving part 23 which transmits/receives data to/from the server and the browsing terminal 3; a contents storage part 21 for storing the contents; and a charging part 22 for charging the browsing terminal 3 described above.

The above-described browsing terminal 3 does not have a storage for storing data, so that contents data fetched from the transmitting/receiving part 37 is saved only in the main storage part 36 configured by a volatile memory but not saved in the EERPOM 35 that is the nonvolatile memory 35. Further, the browsing terminal 3 is provided only with a small/thin recharging-type secondary battery 38, and it does not have an AC plug and a dry-cell battery storage area.

As described above, the browsing terminal 3 stores the contents data not in the nonvolatile memory 35 but in the main storage part 36 formed by the volatile memory, and the power supply thereof is limited to the secondary battery 38. Thereby, the data is automatically erased when the power of the secondary battery 38 runs out. Thus, even if the browsing terminal 3 is lost, the data therein is erased in about one day. Therefore, there is only a low risk of having duplication of the data and the like, so that the security for the data can be remarkably increased in that respect.

The capacity of the secondary battery 38 in the browsing terminal 3 in this exemplary embodiment is limited to the capacity for a prescribed time, e.g., limited to the capacity for allowing the browsing terminal 3 to keep the data only for one day with a full charge.

Further, when the user has a contract for a limited period such as for one month, for example, download of the contents and charging are started at a point where the browsing terminal 3 and the distribution terminal 2 are connected via a wired or radio device, without waiting for a signal inputted from the input part 33. In this sense, the input device is not an essential element for the distribution terminal 2.

The browsing terminal 3 needs to keep the data in the main storage part 36 formed by a volatile memory even in a non-browsing period. Thus, it is necessary to achieve low power consumption of the system.

In order to meet the demands peculiar to the browsing terminal 3, the Inventors of the present invention have designed a power management system capable of achieving low power consumption and keeping data memory through continuously supplying the power to the volatile memory while inactivating the circuits related to the display control part 34 when not browsing, by using a low power consuming volatile memory as the main storage part 36 that serves as the data storing memory.

For example, "μPD4632312" for 32 Mbit mobile RAM, which is a product of NEC Electronics Corporation, stops supply of clock when keeping data (in standby mode), so that consumed current when keeping data is as small as 10 μA.

When such RAM that runs with low power consumption is used, current of 10 μA is consumed while keeping data. Thus, when a voltage of about 2 V is supplied, consumed is a power of only about 0.02 mV. Provided that the capacity of the secondary battery 38 is the power of 1000 mA·h (3 V), it is possible to keep the data for about 40 hours (1000 mA×3 V/0.02 mW*60*60).

Therefore, it is so calculated that the data can be saved for a period of about one day even there is the power consumed by the display control system circuits at the time of updating the screen, as long as there is no power supplied to the display control system circuits during the period other than the period of updating the images on the electronic paper.

Figure 3:
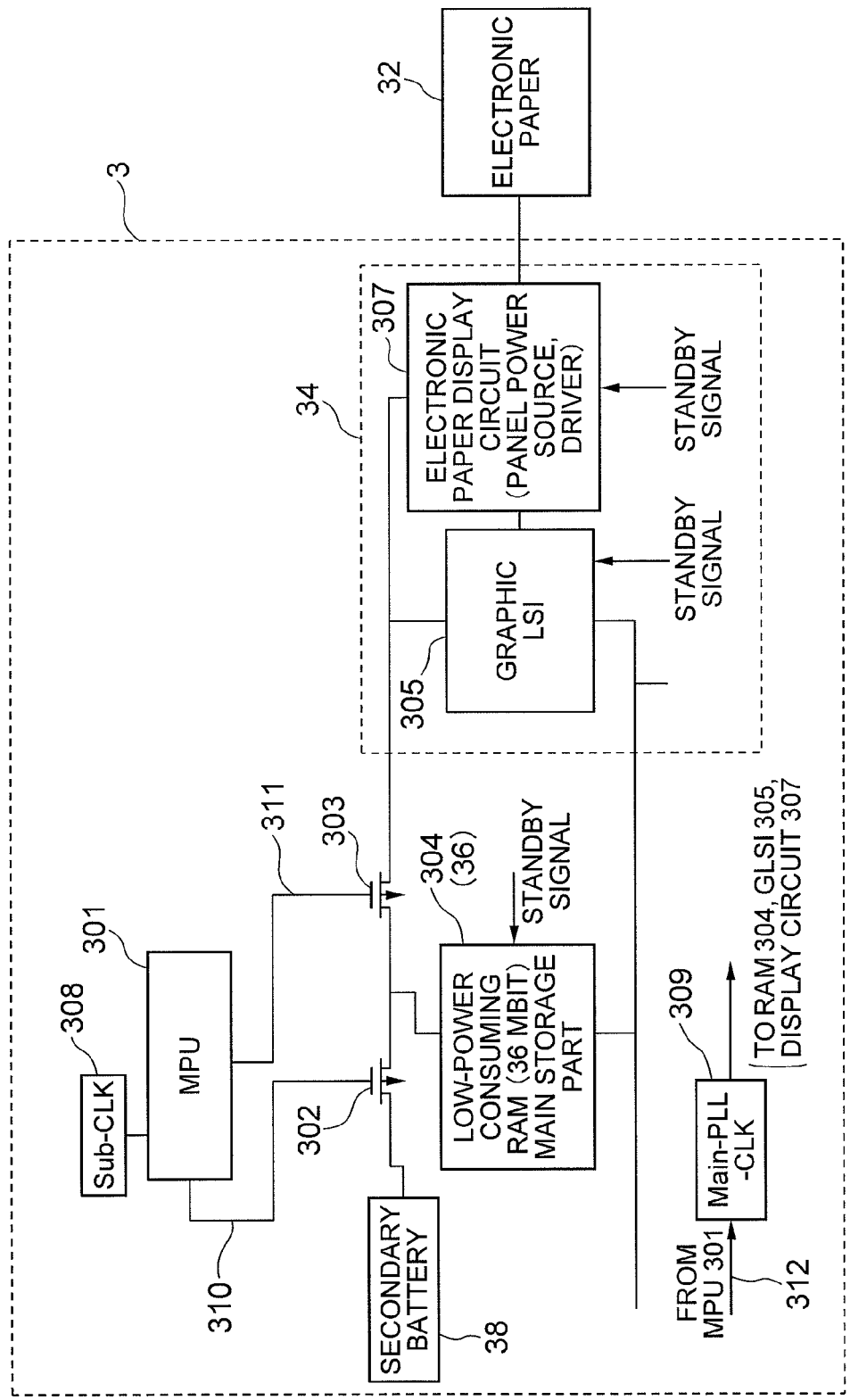
FIG. 3 is a circuit block diagram showing a browsing terminal disclosed in FIG. 1.

FIG. 3 shows an electric circuit of the main part for describing the characteristic operations regarding the power management when the above-described browsing terminal 3 is operated by itself.

The electric circuit of the main part of the browsing terminal 3 is configured, including: a micro controller (MPU) 301 which mainly supplies power management signals; power switches 302, 303 as the switches for turning on and off the power supply current; a low power consuming RAM 304 serving as the main storage part 36 for storing data; a graphics LSI (GLSI) 305 which configures the display control part 34; a panel power supply for driving the panel; and a display circuit 307 including a driver.

The MPU 301 supplies a clock by an extremely low current consuming sub-oscillator 308. The RAM 304, the graphic LSI 305, and the display circuit 307 are driven by a main oscillator 309 provided with a clock enable.

When the power switch 302 and the power switch 303 controlled by the MPU 301 are turned on, a voltage is supplied to the RAM 304, the graphic LSI 305, and the display circuit 307. Further, when the power switch 302 is turned on and the power switch 303 is turned off, a voltage is supplied only to the RAM 304 while no voltage is supplied to the graphic LSI: 305 and the display circuit 307 which configure the display control part 34.

The operation mode of the browsing terminal 3 when operated by itself is classified into two types, i.e., an image updating mode (image updating state) and a standby mode (image non-updating state). Operations of each mode will be described by referring to FIG. 4.

(Browsing Terminal Image Updating Mode)

In FIG. 3, when an image updating instruction is inputted to the browsing terminal 3 by an input signal from the input device (not shown) (FIG. 4: step S1), the MPU 301 sets on a clock enable signal 312 of the main oscillator 309 (FIG. 4: step S2) and turns on the power switches 302, 303 (FIG. 4: step S3) to set each circuit to be in an operation mode. Then, the MPU 301 notifies the number (for example, page number of newspaper, numbers given to the stored contents in order) of screen data inputted via the input device (not shown) to the graphic LSI 305.

Figure 4:
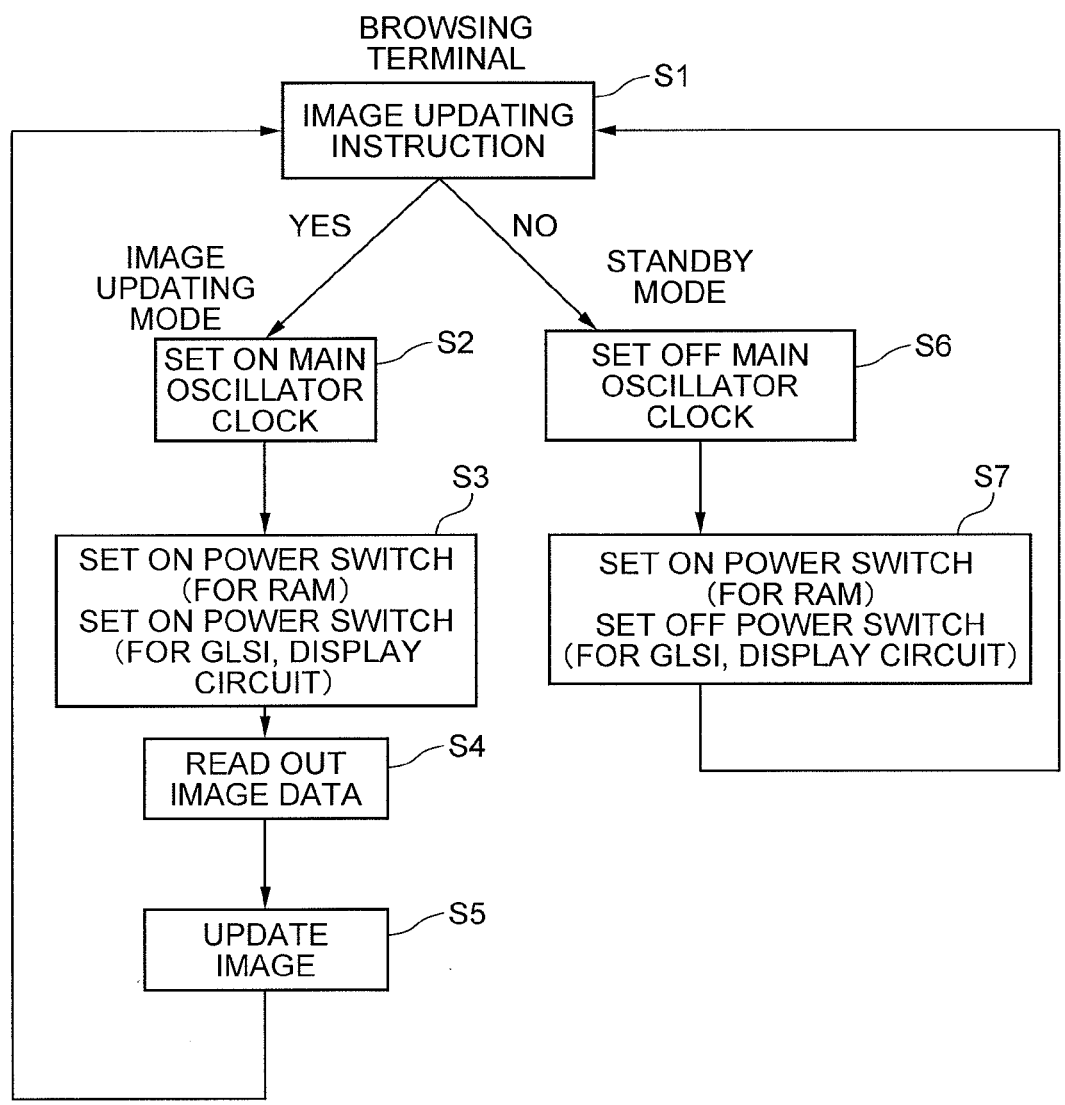
FIG. 4 is a flowchart showing operations of FIG. 1.

The graphic LSI 305 reads out the image data corresponding to the number from the RAM 304 (FIG. 4: step S4), and updates the screen of the display device 32 with a memory function, such as the electronic paper with a memory function (FIG. 4: step S5).

(Browsing Terminal Standby Mode)

Since the browsing terminal 3 uses the display device 32 having the memory function such as the electronic paper having the memory function, it is unnecessary for the graphic LSI 305 and the display circuit 307 as the display control part 34 to operate during the period other than the time of updating the image. Thus, the browsing terminal 3 turns into a standby mode after the period of updating the image.

That is, in the standby mode, the MPU 301 stops the clock of the main oscillator 309 by turning off the clock enable signal 312 of the main oscillator 309 (FIG. 4: step S6), and stops the supply of voltage to the graphic LSI 305 and the display circuit 307 by turning off only the power switch 303 (FIG. 4: step S7). Since the signal of the power switch 302 remains to be on, the voltage is being supplied to the RAM 304 even though the clock is not supplied. Thereby, the RAM is in an extremely low power consumption mode for the data keeping state.

With this, the current consumption of the MPU 301 becomes about 1 µA and the current consumption of the RAM 34 becomes about 10 µA, for example. Thus, in an extremely low power consumption state of about 10-11 µA, the browsing terminal 3 comes to be in a standby state for receiving an input of the image number while keeping the contents data stored in the RAM 304.

In this circuit, the sub-oscillator 308 and the main oscillator 309 are separated. However, it is also possible to have a structure in which the MPU 301 has a clock stop device 305 or the like which stops the clock inside each IC by sending a standby signal to each IC of the graphic LSI 305 and the like from the MPU 301.

As described above, it becomes possible to achieve the browsing terminal capable of keeping contents data for about one day only with the secondary battery without destroying the stored contents data through using the electronic paper having the memory function as a display, and activating only the volatile memory while inactivating the graphic LSI and the display system circuits in the image non-updating mode.

(1.3) Operations of Inter-Terminal Communication System

Next, operations between the browsing terminal 3 and the distribution terminal 2 of the above-described inter-terminal communication system will be described by referring to a flowchart of FIG. 5.

First, the user mounts the browsing terminal 3 to the distribution terminal 2.

The, the distribution terminal 2 transmits headline information to the browsing terminal 3. The browsing terminal 3 receives the headline information (FIG. 5: step S10). The browsing terminal 3 displays the headline information on the display part without storing the received data to the volatile memory (FIG. 5: step S11).

At this time, the volatile memory of the browsing terminal 3 is not used for displaying the headline information. Further, the power supply of the display device 32 of the browsing terminal 3 and the data are directly driven by the browsing terminal 3, and the power of the display device 32 depends on the direct supply from the distribution terminal 2. Thus, the data does not remain on the browsing terminal 3 side, so that there is no need to worry about data leakage.

Figure 5:
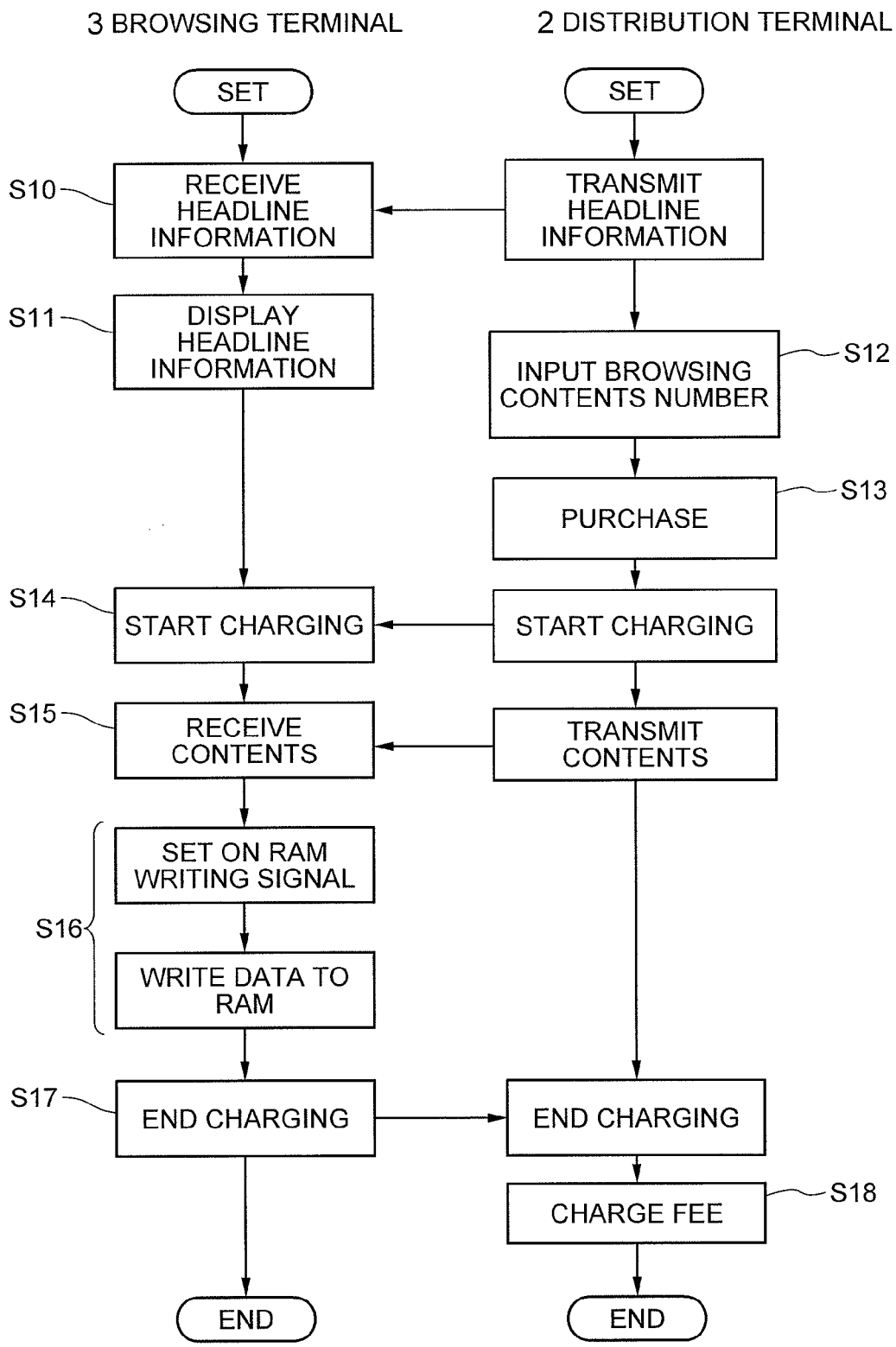
FIG. 5 is a flowchart showing operations of FIG. 1.

The user selects necessary download contents by using the input device of the browsing terminal 3 or the distribution terminal 2 (FIG. 5: step S12), and purchase the selected contents (FIG. 5: step S13).

Then, the distribution terminal 2 supplies the power to the browsing terminal 3, and starts charging by the distribution terminal 2 to the secondary battery (FIG. 5: step S14). Thereafter, the distribution terminal 2 transmits the contents towards the browsing terminal 3, and the browsing terminal 3 receives the contents (FIG. 5: step S15). A writing signal is set on by the MPU 301, and the contents data is written to the volatile memory (FIG. 5: step S16). When the charging to the browsing terminal 3 ends (FIG. 5: step S17), the user removes, from the distribution terminal 2, the browsing terminal 3 to which the contents data has been stored. At this time, the fee is charged (FIG. 5: step S18)

When an operating system (OS) is required for the browsing terminal, a step of transmitting an operating system for enabling operation of the browsing terminal from the distribution terminal, a step of installing the operating system to the main storage (RAM) of the browsing terminal, and a step of starting up the operating system in the browsing terminal may be performed after starting the charging in step S5 and before receiving the contents in step S6 before removing the browsing terminal from the distribution terminal. In this way, the browsing terminal can be charged when starting up the OS, which consumes a large amount of power. Therefore, consumption of the power of the secondary battery can be suppressed.

(1.4) Effects of First Exemplary Embodiment

As described above, the browsing terminal 3 stores the contents data not in the nonvolatile memory but in the volatile memory, and the power source is limited to the secondary battery. Thus, when the power accumulated in the second battery runs out, the data is automatically erased. Therefore, the data is erased in about one day even if the browsing terminal is lost, so that the security of the data can be improved. Further, it becomes possible to achieve the browsing terminal 3 that is capable of holding the contents data for about one day only with the secondary battery without destroying the stored contents data through using the electronic paper of the like having the memory function as the display of the browsing terminal 3, and activating only the volatile memory while inactivating the display controller and the display system circuit at the time of the image non-updating mode (operating in the standby mode or the data holding mode).

As an exemplary advantage according to the invention, the present invention is so structured that the introduced data is stored in the volatile memory and the power is controlled with the secondary battery. Thus, even if the contents browsing terminal is lost, the data is erased in about one day, for example. Therefore, the security of the data can be improved effectively.

Second Exemplary Embodiment (2.1) First, the Basic Structures of the Contents Data Transmitting/Receiving System and the Inter-Terminal Communication System will be Described by Referring to FIG. 6

This second exemplary embodiment has been designed as the systems which can meet the demand of users, which is to be able to charge the browsing terminal at home and to be able to download the contents of the browsing terminal to the own PCs (personal computers).

Figure 6:
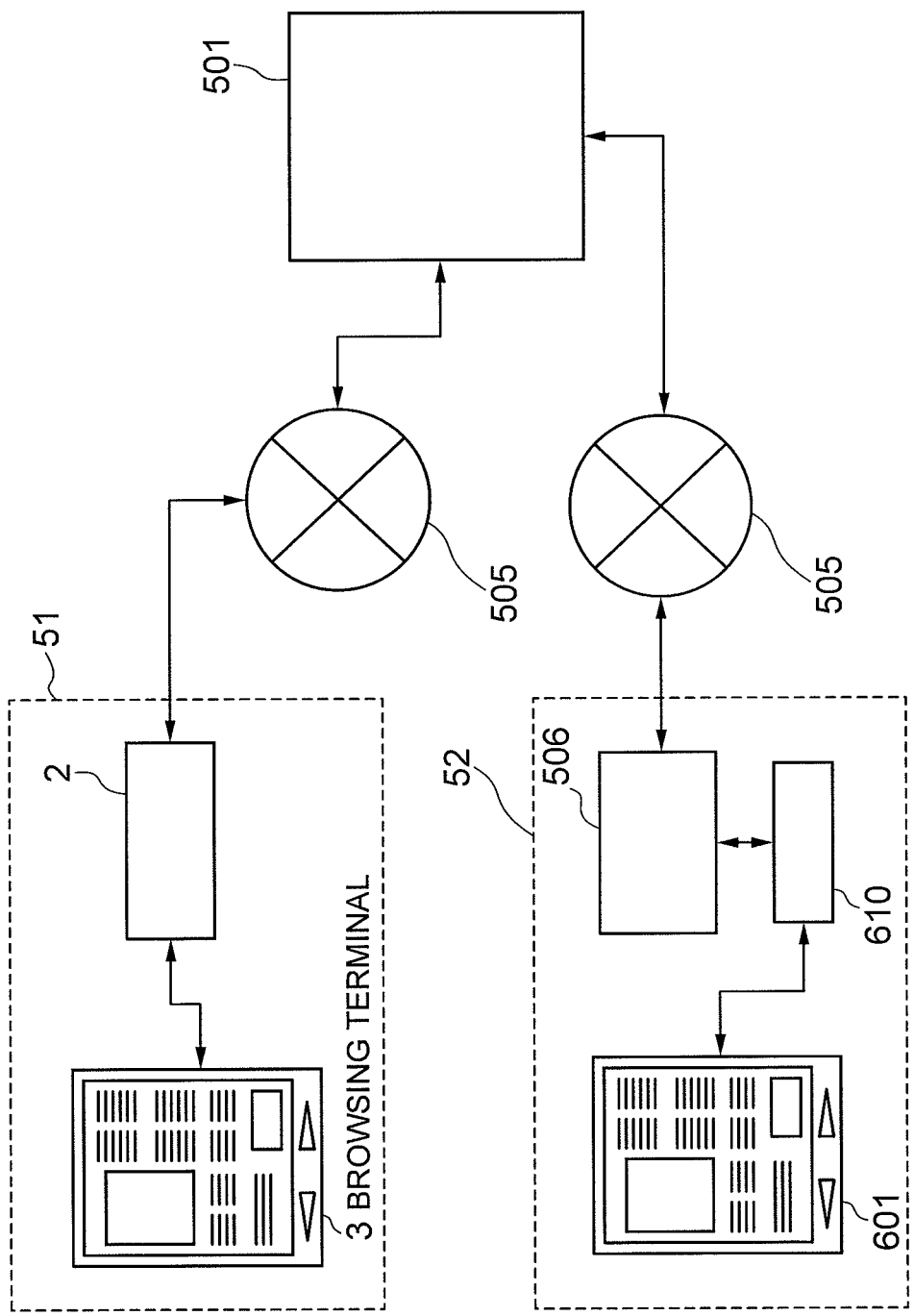
FIG. 6 is a schematic block diagram showing a structure of a data transmitting/receiving system for contents data according to a second exemplary embodiment of the present invention.

Specifically, it is a feature point of the second exemplary embodiment to connect the two systems, i.e., the system configured under a public setting environment shown with reference numeral 51 shown in FIG. 6 and the system configured with a household setting environment shown with reference numeral 52 in FIG. 5, to a server 501.

In this case, the system in the public setting environment 51 includes a distribution terminal 2 and a browsing terminal 3, which are equivalent to those shown in FIG. 1-FIG. 5 described above, and it is in the same structural contents as those of the first exemplary embodiment.

In the meantime, the system in the household setting environment 52 is in peculiar structural contents of the second exemplary embodiment as will be described below.

First, in FIG. 6, basically, the part for the contents data transmitting/receiving system for the public setting environment 51 includes: the server 501 for distributing newspaper contents; the contents distribution terminal 2 for receiving the contents from the server 501; and the browsing terminal 3 for browsing the contents obtained from the contents distribution terminal 2. The specific structural contents, actions, and the operational effects thereof are the same as those of the first exemplary embodiment.

In the meantime, the contents data transmitting/receiving system for the household setting environment 52 includes: a connected terminal 506 such as a PC connected to the server 501 via the Internet; a charging terminal 610 provided along the connected terminal 506; and a browsing terminal 601 provided along the charging terminal 610. For the browsing terminal 601 and the server 501, the same terminal and server as those of the above-described first exemplary embodiment are used.

The charging terminal 610 is distributed to the user that has subscribed to a newspaper publishing company, for example, by paying a special fee, and it has a function of enabling charging of the browsing terminal 601 and download of contents. At the same time, the charging terminal 610 has a charging amount measuring function (a function as a charging amount measuring device) for measuring the charging amount to the browsing terminal 601.

In this case, the charging terminal 610 measures the charging amount by simply measuring the voltages of both ends of the secondary battery of the browsing terminal 601. In the meantime, more preferably, measurement and monitoring of the flows of the electric charges may be conducted by a coulomb counter IC or a more sophisticated remaining amount display IC. Further, it is so structured to charge the fee by a fee-charging amount determining device (not shown) that is programmed in the MPU or the like (not shown) on the charging terminal 610 from the charging amount and the charging fee data table stored in an EEPROM 614 (storage element).

Regarding the above-described fee-charging system, the second exemplary embodiment may also be so configured that the fee-charging system according to the charging amount is set within the server 501 by transmitting the information of the charging amount of the browsing terminal 601 to the server 501 via the charging terminal 610 and the connected terminal 506. Further, it may also be so configured that the fee-charging system can be set for allowing unlimited charging.

Furthermore, it is a feature point in the system of the second exemplary embodiment that an authentication ID is registered to the browsing terminal 601 and the charging terminal 610. Moreover, it is a feature point that an authentication ID for the connected terminal 506 such as a PC is given to the user, and charging, download of the contents and browsing with the connected terminal 506 such as the PC are allowed only between the terminals 601 and 501 whose authentication IDs are identical.

Further, the user can download the contents data of old newspapers from the server 501 to the PC 506 whose authentication ID is being registered, and upload the contents data to the browsing terminal 601 via the charging terminal 610.

Before the charging, the authentication IDs are collated between the charging terminal 610 and the browsing terminal 601. Due to such step, exchange of data and charging to the terminal can only be achieved in a closed system within a household, for example, so that unlawful charging and exchange of data become difficult to be conducted. This naturally provides an advantage of improving the security.

(2.2) Structure of Inter-Terminal Communication System

Figure 7:
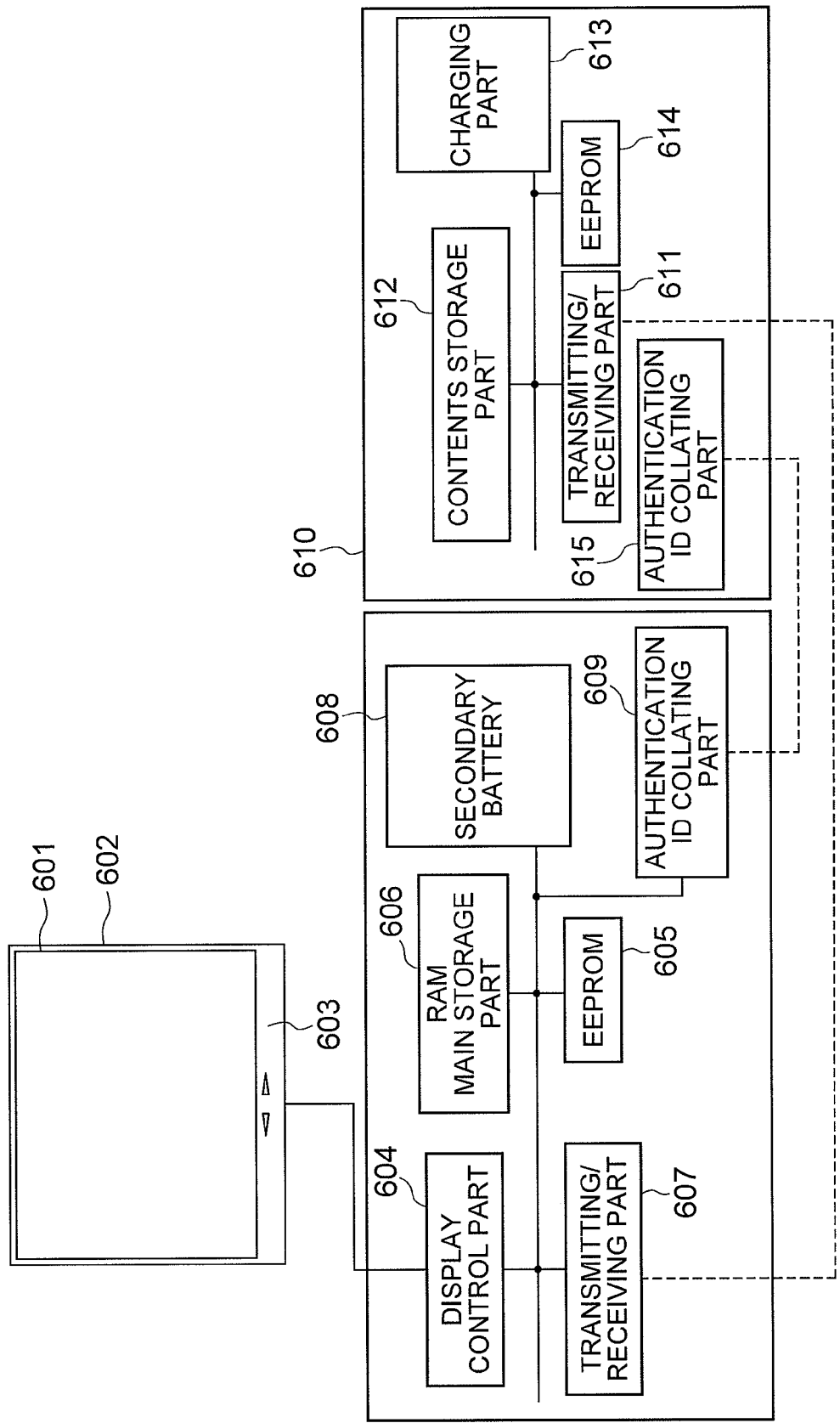
FIG. 7 is a block diagram showing a circuit structure of an inter-terminal communication system which configures the main part of the data transmitting/receiving system disclosed in FIG. 6.

FIG. 7 shows the specific structural contents for achieving the contents data transmitting/receiving system shown in FIG. 6.

FIG. 7 is an illustration showing the inter-terminal communication system for transmitting/receiving data between the browsing terminal 601 and the charging terminal 610 mutually. The browsing terminal 601 includes: a display device 602 having a memory function configured with an electronic paper or the like having a memory function; an input part 603 provided with a plurality of input keys; a nonvolatile memory 605 such as an EEPROM to which an authentication ID is registered; a main storage part 606 configured with a volatile memory such as a RAM; a browser-side transmitting/receiving part 607 which exchanges contents data with the charging terminal 610 by radio transmission or the like; a secondary battery 608 for supplying power to each part within the terminal; and an authentication collating part 609.

Note here that the above-described browsing terminal 601 has all the specific structural elements (see FIG. 2 and FIG. 3) of the browsing terminal 3 of the first exemplary embodiment, except for the authentication ID collating part 609.

The charging terminal 610 is configured with: a transmitting/receiving part 611 which transmits/receives data to/from PCs and the browsing terminal 601; a contents storage part 612 for storing the contents; a charging part 613 for charging the browsing terminal 601; a nonvolatile memory 614 such as an EEPROM to which an authentication ID is registered; and an ID collating part 615.

(2.3) Operations of Inter-Terminal Communication System

Next, operations regarding contents distribution performed between the browsing terminal 601 and the charging terminal 610 of the above-described inter-terminal communication system will be described by referring to a flowchart of FIG. 8.

Figure 8A:
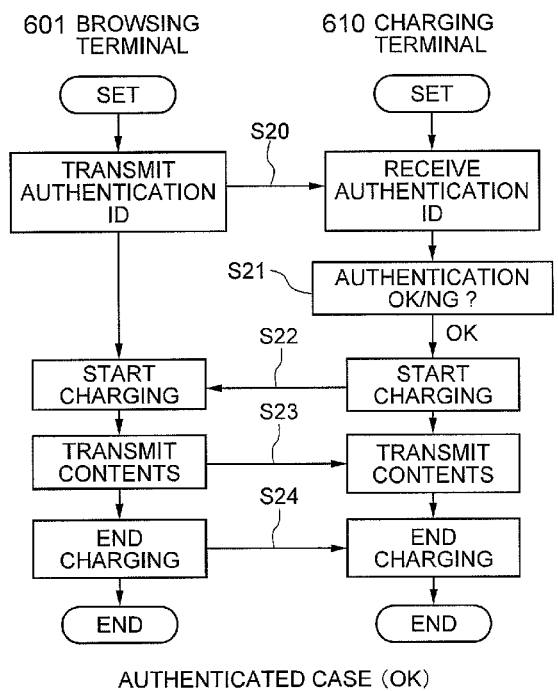
FIG. 8 is a flowchart showing operations of FIG. 6.

The user mounts the browsing terminal 601 to the charging terminal 610. The browsing terminal 601 transmits the authentication ID to the charging terminal 610 via the transmitting/receiving part 607, and the charging terminal 610 receives the authentication ID (FIG. 8A: step S20). The charging terminal 610 compares the transmitted authentication ID with the authentication ID that is registered to itself (FIG. 8A: step S21). When the authentication IDs are consistent, it becomes possible to conduct charging and download/upload of the contents (FIG. 8A: steps S22 and S23). In this state, charging to the browser terminal 601 and the charging terminal 610 ends (FIG. 8: step S24).

Figure 8B:
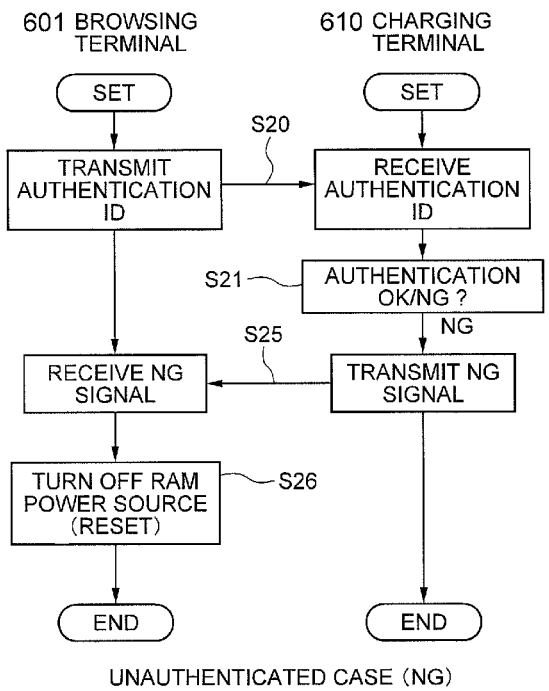

In the meantime, when the authentication IDs are inconsistent, the charging terminal 610 transmits an NG signal to the browsing terminal 601 (FIG. 8B: step S25), and the browsing terminal 601 sets off the voltage of the volatile memory (main storage part) 606 to reset the volatile memory 606 so as to erase the stored contents data (FIG. 8B: step S26). At the same time, discharging of the secondary battery 608 is started. Therefore, eve when there is an attempt to download the charged data by using an unlawful means, the contents data is erased. As a result, the security becomes improved further.

A switch for short-circuiting the high-potential side with the low-potential side may also be provided as a method for setting off the voltage of the volatile memory (main storage part) 606. The switch for short-circuiting the high-potential side with the low-potential side may cause a bad influence when it malfunctions, which may result in destroying the electric circuit system within the device. Therefore, a following measure may be employed as the method.

For example, in the second exemplary embodiment, the power switch shown in the browsing terminal 3 of FIG. 3 described above is turned off, and the power switch 303 is turned on. Further, when the supply of clock for the graphic LSI 305 and the display circuit 307 as the display control part 34 is stopped, the clock enable signal 312 is transmitted to supply the clock.

Thereby, the voltage held in a power line that connects the volatile memory 304 and the display control part 34 is instantly discharged. Thus, the potential of the high-potential side is lowered, and the contents in the volatile memory 304 are erased.

In the meantime, it is also possible to write meaningless data signals such as a long list of NULL signals on the whole volatile memory, instead of setting off the voltage of the volatile memory.

(2.4) Effects of Second Exemplary Embodiment

As described above, the step of collating the authentication IDs between the charging terminal 610 and the browsing terminal 601 is added at the time of charging. Therefore, exchange of data and charging to the terminal can only be achieved in a closed system within a household, for example. This makes it difficult to conduct unlawful charging and exchange of data, so that the security can be improved.

Further, when the authentication IDs are inconsistent, the browsing terminal 601 stops the supply of voltage to the volatile memory 606. Alternatively, meaningless data is written and the power of the secondary battery is discharged at the same time, so that the operation of the volatile memory 606 is stopped. Thus, the contents data stored in the volatile memory 606 itself is erased. This makes it possible to prevent charging and stealing data by an unlawful means, so that the security is improved further.

Furthermore, the fee-charging system can be managed only with the charging amount to the browsing terminal 610, so that it is unnecessary to employ a complicated fee-charging system which charges the fees by combining the downloaded amount of the contents and the charging amount. Therefore, it is possible to provide a user-friendly fee-charging system.

Each of the exemplary embodiments 1 and 2 has been described by referring to the case where the whole contents data is stored in the volatile memory of the browsing terminal. However, the contents data whose information is not considered confidential or contents data whose information is highly opened to the public (e.g., headline information) may be saved in the nonvolatile memory. This makes it possible to select the article the user desires to purchase, even in a state where the browsing terminal is not connected to the data distribution terminal.

At this time, regardless of the necessity of fee-charging and the authentication ID, the headline information is displayed on the screen of the browsing terminal 3 (or 601) when the browsing terminal 3 (or 601) is mounted to the data distribution terminal 2 or the charging terminal 610.

Note here that the browsing terminal 3 (or 601) may be structured to include also a nonvolatile memory for storing the contents purchase history. By saving the purchase history, it becomes possible to select the contents the user desires to upload from the purchase history, and upload the contents again when connected to the distribution terminal 2. In this case, it is preferable to have the validity period information of the contents set by the contents distribution maker at the same time.

By setting the system such that re-upload cannot be done after the validity period (e.g., one week) has passed, it becomes unnecessary to save old information in the distribution terminal 2. Thus, the memory capacity of the distribution terminal 2 can be decreased. At the same time, this makes it possible for the contents distribution maker to give a new additional value to the old contents. The new additional value herein means to increase income by advertisement through updating the advertisement information embedded in the contents to the latest information or to use a different fee-charging mode for the old contents such as setting the use of limited period (one year, for example) with a special fee (fixed amount, for example).

Further, regarding the data stored in the server, the data distribution terminal, and the charging terminal, it is preferable to have metadata from which the headline information that shows only the subject of the article, the filed of the detailed article, the data and time of distribution from the news agency, the size of the article, and the article number can be known embedded therein, and to have metadata for increasing the display effects of the contents embedded therein.

For example, specific features are given to the metadata in the data presenting method and direction. In a vertically written article of Japanese or Chinese, for example, the data is displayed in order by a block width that is a lateral width of a single character (a large block if the font is large) from the right side of the presenting area from the top to the bottom, and then displayed from the top to the bottom in a next column shifted to the left side.

In the meantime, in a laterally written article in Arabic, the data is displayed in order by a block width that is a longitudinal width of a single character (a large block if the font is large) from the upper side of the presenting area from the right to the left, and then displayed from the right to the left in a next row shifted to the lower side. In other languages of lateral writing, data can be written from the upper left as well.

Further, in a case of enlarging a picture within a newspaper space, for example, an effect of a difference in the enlarging methods such as those described in following descriptions (1) and (2) may be embedded in the metadata.
(1) Display high-resolution image data (carried as different page data) directly
(2) Simply display laterally-and-vertically enlarged data of original low-resolution data first, and then present high-resolution data Further, the browsing terminals 3 and 601 may have a touch panel as an input device. In that case, input data is stored to the volatile memory. The inputted and stored data can also be downloaded to a mother device (the contents distribution terminal, the charging terminal) via the authentication ID collating part.

Furthermore, the contents transmitting/receiving system can be structured to be able to transmit the data to the server side via the authentication ID collating part. The use of such device can make it possible to provide a highly secured electronic patients' chart system with which the input information can be protected.

(Example of Server)

Figure 9:
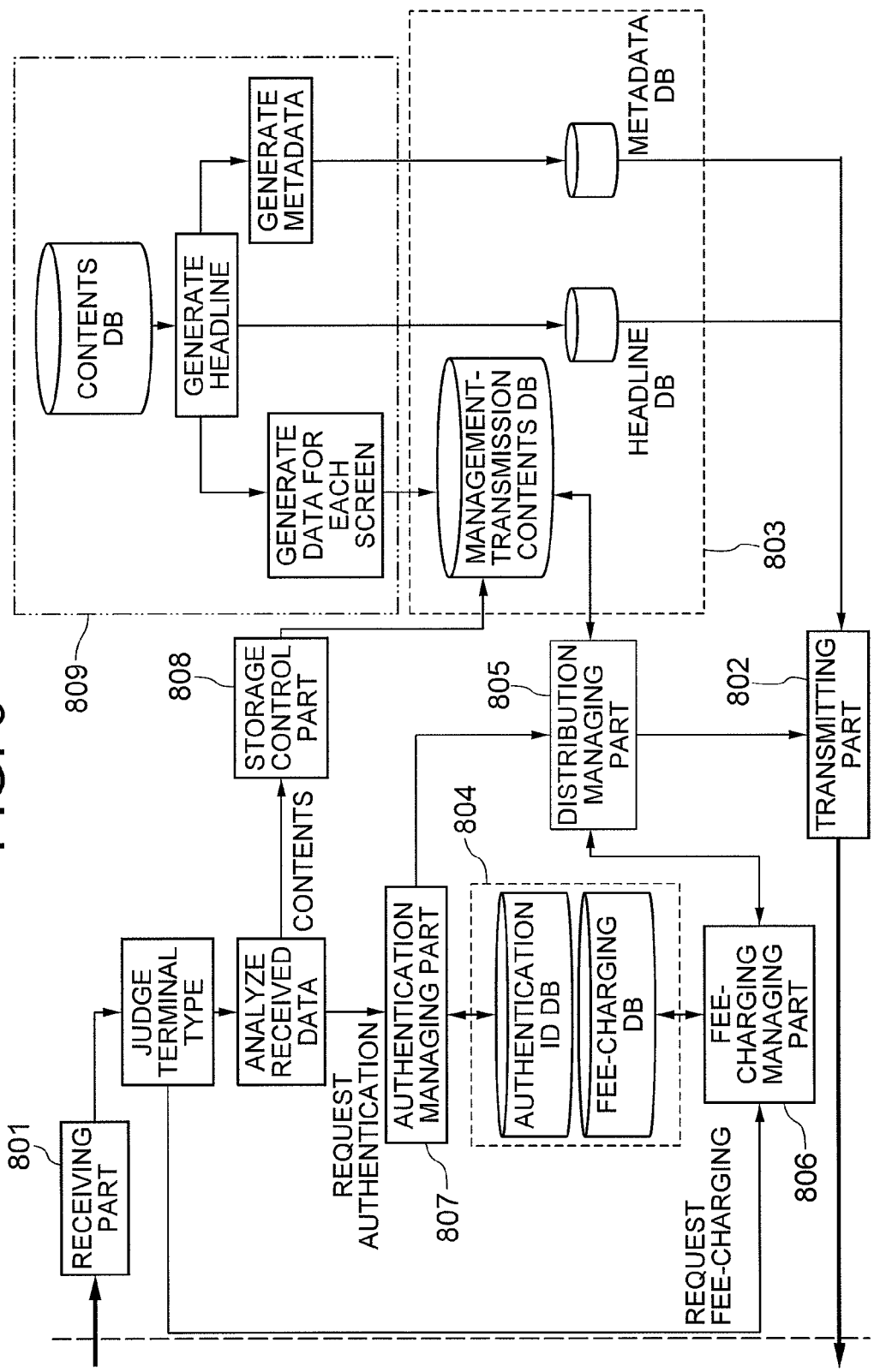
FIG. 9 is a block diagram showing a structural example of servers disclosed in FIG. 1 and FIG. 6.

FIG. 9 shows an example of the server 11 (501) used in the contents transmitting/receiving systems disclosed in each of the above-described exemplary embodiments.

The server shown in FIG. 9 is configured with a receiving part 801, a transmitting part 802, a transmission database (transmission DB) 803, a user information database (user information DB) 804, and the like. Furthermore, a distribution managing part 805, a fee-charging managing part 806, an authentication managing part 807, a storage control part 808, and the like are provided as necessary. Moreover, a contents processing part 809 for generating headline information and metadata from the original contents database may also be provided.

Upon receiving a signal from the distribution terminal or the like by the receiving part 801, the server shown in FIG. 9 judges the terminal type to find out whether the terminal is the distribution terminal or the connected terminal, and immediately transmits a fee-charging request to the fee-charging managing part depending on the information transmitted from the terminal. Further, the received data is analyzed. When the data is analyzed as the contents uploaded by the user to the database of the server, the contents are stored to the management-transmission contents database via the storage control part 808.

In the meantime, when the received data is an authentication request, it is verified with the authentication ID database by the authentication managing part 807, and the verification result is transmitted to the distribution managing part 805. The fee-charging managing part 806 manages the fee by comparing it with the fee data in accordance with the fee-charging request immediately after the judgment of the terminal type or the fee-charging request from the distribution managing part 805 after the authentication.

When a distribution is permitted through the authentication and fee-charging, the distribution managing part 805 transmits the contents data to the transmitting part 802 from the management-transmission contents database. Information of the headline database and the metadata database is transmitted to the transmitting part 802 constantly, and the transmitting part 802 transmits the data to the terminal side.

As described above, in the data transmitting/receiving systems described in each of the exemplary embodiments, the data of the browsing terminal is stored in the volatile memory, and the operating power of the volatile memory is controlled only with the secondary battery. Thus, the data is erased in about one day, even if the terminal is lost. Therefore, the security of the data can be improved.

Further, the electronic paper having the memory function is used as the display of the browsing terminal, and only the volatile memory is activated (operating in the standby mode or the data holding mode) while the display controller and the display system circuit are inactivated at the time of the image non-updating mode. Therefore, it becomes possible to hold the contents data for about one day only with the secondary batter without destroying the stored contents data.

Furthermore, regarding the associated operations of the charging terminal and the browsing terminal, the authentication ID collating step makes it impossible to conduct charging and stealing data by an unlawful means. Therefore, the security is improved further. At the same time, the fee-charging can be managed only with the charging amount, so that it is possible to build the user-friendly fee-charging system.

Third Exemplary Embodiment

Next, a third exemplary embodiment of the present invention will be described. In this exemplary embodiment, the display device of the browsing terminal has a memory function, which continues to display the screen without supply of power. Thus, the most-lately browsed screen is not erased even if the power of the browsing terminal runs out, the main power source of the browsing terminal is turned off, etc. Therefore, if the information displayed on the screen carries confidential contents, there faces an issue security. Thus, it is necessary to surely erase the data on the main storage (volatile memory) while shutting down the display screen, when the power of the browsing terminal runs out, the main power source of the browsing terminal is turned off, etc.

(3.1) Method for Shutting Down Browsing Terminal

The third exemplary embodiment shows an example of controlling the shutdown operations of the browsing terminals of the first and second exemplary embodiments described above. The operations will be described hereinafter.

The browsing terminal is formed with a same structure as that of FIG. 2, except that it also has a device for monitoring the charged amount of the secondary battery. This charged-amount monitoring device simply measures the voltages of the both ends of the secondary battery, and monitors whether it is below a set lower-limit voltage. More preferably, the monitoring device may be structured to monitor the charged amount by a coulomb counter IC or a more sophisticated remaining-amount display IC.

Next, the browsing terminal shutdown method according to the third exemplary embodiment will be described by referring to flowcharts of FIG. 10 and FIG. 11.

The MPU of the browsing terminal operates as the monitoring device, and the monitoring device monitors the remaining charged amount of the secondary battery at a specific cycle (FIG. 10: step S30). As a result, when the remaining charged amount is equal to or more than the set remaining amount, the monitoring device repeats the above-described standby mode (FIG. 10: step S31) and a screen updating mode (FIG. 10: step S32). After a specific time has passed, the monitoring device shifts the processing to a remaining charged amount monitoring step (FIG. 10: step S30).

When the remaining charged amount is less than the set remaining amount, the monitoring device shifts the processing to a shutdown sequence. In the shutdown sequence, a writing signal for the RAM (the volatile memory as the main storage) is set on (FIG. 10: step S33). Then, a shutdown screen data is written to a frame buffer (a memory area which stores the update screen data the display device having the memory function is to display) which is a part of the main storage (FIG. 10: step S34). As the shutdown screen data, a white screen may simply be presented. Alternatively, a screen indicating run-down or meaningless random data may be presented as well. When the white screen or meaningless random data is employed as the shutdown screen data, such data may be generated by the MPU automatically. When the screen indicating run-down is employed as the shutdown screen data, it is also possible to provide a nonvolatile memory for storing the screen data and transfer the data to the frame buffer from the nonvolatile memory. Further, the screen may be erased by having a data driver of the display device output white screen display voltage or a black screen display voltage (referred to as white voltage or black voltage hereinafter) forcibly by a signal from the MPU or by applying a white voltage or a black voltage to the display device by oscillating a COM potential that is the reference potential of the display device.

Then, the MPU of the browsing terminal updates the screen of the display device (FIG. 10: step S35). Thereafter, the MPU of the browsing terminal sets on the reset signal for the RAM and stops the power supply to the RAM so as to erase the data within the RAM (FIG. 10: step S36). Then, the MPU ends the processing.

This makes it possible to shut down the screen and erase the data on the main storage part (volatile memory) surely, when the charged amount of the secondary battery becomes less than the set remaining amount. Further, when the user of the browsing terminal turns off the main power source, the MPU generates an interruption and shifts the processing to the sequence of FIG. 11.

First, when the main power source of the browsing terminal is turned off, the MPU sets on the writing signal for the RAM (FIG. 11: step S37) to write the shutdown screen data (FIG. 11: step S38). The shutdown screen data may be set as a screen that is different from the case where the remaining charged amount becomes less than the set remaining amount, e.g., may be set as a favorite image of the user, logo of the service provider maker, etc. In the case of using the user's favorite image, such image may be stored in a specific area of the volatile memory and transferred to the frame buffer at the time of shutdown. Alternatively, it is also possible to provide a nonvolatile memory in addition, store the favorite image or the logo of the service provider in that nonvolatile memory, and transfer it to the frame buffer at the time of shutdown.

By providing different shutdown screen data for the cases of FIG. 10 and FIG. 11, the user can know whether the browsing terminal is shut down properly or shut down because of the run-down of the battery.

Then, the screen of the display device is updated (FIG. 11: step S39). Thereafter, the browsing terminal shifts to the standby mode (FIG. 11: S40), and the monitoring device monitors the remaining charged amount of the secondary battery regularly.

When the main power source of the terminal is turned on, the processing is returned to a normal power-on sequence. Further, when the remaining charged amount of the secondary battery becomes less than the set remaining amount, the processing is shifted to the shutdown sequence.

As described above, when the switch of the main power source of the terminal is turned off, the display screen is shut down. However, the power is continuously supplied to the MPU and the main storage part. This is to make it possible to keep the data on the main storage part for allowing the user to read the data again, when the switch of the main power source of the terminal is turned on.

(3.2) Effects

By having the shutdown sequence of the browsing terminal in the manner described above, it is possible to automatically erase the uploaded contents from the main storage part formed by a volatile memory such as a RAM and also to shutdown the screen of the display device having the memory function, when the remaining charged amount of the secondary battery of the browsing terminal becomes less than the set remaining amount. This makes it possible to achieve a low-power consuming browsing terminal with the display device having the memory function, which is capable of continuously displaying the screen without supply of power while preventing the confidential information from being continuously displayed on the screen after the power of the browsing terminal runs out. This results in improving the security.

Further, by keeping the data on the main storage while shutting down the display screen when the main power source of the terminal is turned off, it becomes possible to brows the data without remounting the terminal to the distribution terminal and the charger when the main power source of the browsing terminal is turned on again.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention is capable of improving the security, so that it is possible to effectively prevent contents data stored in a terminal from being stolen unlawfully by a third party even if the terminal is accidentally lost.

What is claimed is:

1. A charging terminal, comprising:
   a storage element for storing an authentication ID;
   an authentication ID collating part for collating the authentication ID with an authentication ID of a contents browsing terminal that receives contents from a server; and
   a charging part for charging the contents browsing terminal when receiving a collation result from the authentication ID collating part indicating that the authentication IDs are consistent,
   wherein the contents browsing terminal stores the contents in a volatile memory, and
   the contents browsing terminal resets the volatile memory when the authentication IDs are inconsistent.

2. A charging terminal, comprising: storage means for storing an authentication ID;
   authentication ID collating means for collating the authentication ID with an authentication ID of a contents browsing terminal that receives contents from a server; and charging means for charging the contents browsing terminal when receiving a collation result from the authentication ID collating means indicating that the authentication IDs are consistent, wherein the contents browsing terminal stores the contents in a volatile memory, and the contents browsing terminal resets the volatile memory when the authentication IDs are inconsistent.

\* \* \* \* \*